UNITED STATES PATENT OFFICE.

WILHELM OLSCHEWSKY, OF BERLIN, GERMANY.

PROCESS OF PREPARING RAW MIXTURES FOR BRICKS MADE OF LIME AND SAND.

SPECIFICATION forming part of Letters Patent No. 684,649, dated October 15, 1901.

Application filed July 24, 1901. Serial No. 69,593. (No specimens.)

*To all whom it may concern:*

Be it known that I, WILHELM OLSCHEWSKY, a subject of the King of Prussia, German Emperor, and a resident of 31 Kesselstrasse, Berlin, Kingdom of Prussia, German Empire, have invented a new and useful Process of Preparing the Raw Mixture for Bricks Made of Lime and Sand, of which the following is an exact specification.

My invention relates to a new and improved process of preparing a raw mixture for bricks made of lime and sand, and has especially for its purpose to provide a process by means of which it is attained that a heating of the whole raw mixture and afterward cooling of the same is no more necessary.

The process hitherto used for preparing the raw mixture consists in mixing about eighty-four per cent. of sand ($SiO_2$) with six per cent. of caustic lime (CaO) and ten per cent. of water, ($H_2O$,) whereafter the whole mixture is heated in a closed vessel in order to transfer the caustic lime (CaO) into calcium hydroxid, $Ca(OH)_2$ and in order to attain a formation of calcium silicate. After heating the whole mixture it must be cooled again, whereby the whole heat applied is lost. In order to avoid this, I provide my new process, in which not the whole mixture, but only a small quantity of the same, is heated. This part to be heated consists of the six per cent. of caustic lime (CaO) and so much water as is necessary to transfer the caustic lime (CaO) into calcium hydroxid or slaked lime, $Ca(OH_2)$, (about two per cent.,) to which mixture only about one-third of the whole quantity of sand is added in order to attain a formation of calcium silicate by the mixture of the calcium hydroxid with silicic acid. This latter mixture is heated in a closed vessel in order to avoid the vaporation of the water, whereafter the vessel is opened and the rest of the sand and the water necessary for attaining the right raw mixture is added. By adding the rest of the raw mixture after the heating the temperature of the whole mixture is reduced to about 20° to 30° centigrade, as the heated mixture transfers its heat to the sand and water afterward added, so that the whole mixture can be immediately pressed into bricks.

Having thus fully described the nature of my said invention, what I desire to secure by Letters Patent of the United States is—

1. A new and improved process of preparing the raw mixture for bricks made of lime and sand, consisting in mixing the quantity of slaked lime to be used with about one-third of the quantity of sand to be used, heating this mixture in a closed vessel, and afterward adding the rest of the sand and the water necessary for attaining the right mixture, substantially as set forth.

2. A new and improved process of preparing the raw mixture for bricks made of lime and sand, consisting in mixing the quantity of caustic lime to be used with a quantity of water sufficient for slaking the lime and adding about one-third of the quantity of sand to be used, heating this mixture in a closed vessel and afterward adding the rest of the sand and the water necessary for attaining the right mixture, substantially as set forth.

3. Process of preparing the raw mixture for bricks made of lime and sand, consisting in mixing six per cent. of caustic lime with so much water as is necessary for slaking the lime, adding to this mixture about twenty-eight per cent. of sand, heating this mixture in a closed vessel and afterward adding fifty-six per cent. of sand and so much water as is necessary in order to attain a mixture containing ten per cent. of water, substantially as set forth.

In testimony whereof I have signed my name to this specification in the presence of two subscribing witnesses.

WILHELM OLSCHEWSKY.

Witnesses:
  WOLDEMAR HAUPT,
  HENRY HASPER.